Patented May 22, 1945

2,376,595

UNITED STATES PATENT OFFICE 2,376,595

TEXTILE FINISHING COMPOSITION

John M. Hood, Riverside, Conn., assignor to American Cyanamid Company, New York, N. Y., a corporation of Maine No Drawing. Application June 10, 1942, Serial No. 446,527

4 Claims. (Cl. 260—6)

This invention relates to the finishing of textiles such as cotton, wool, silk, spun rayon and nylon cloth, and more particularly to the application thereto of a permanent finish to cloth that is laundry-resistant and not readily removed by washing.

It has previously been proposed to apply aqueous emulsions of alkyd resins and other similar resins to textile fabrics including white, printed, discharge printed and plain dyed goods in order to improve the hand of the fabrics. A principal object of the present invention resides in the provision of a non-yellowing finish of this type which will produce a full, crisp hand on the fabric and which is resistant to yellowing and discoloration by the action of light and chlorine used in laundry bleaches. A still further object resides in the provision of an emulsion possessing good stability upon storage, either at unusually high or unusually low temperatures.

I have discovered that textile finishing emulsions possessing the above and other advantages are obtained by emulsifying an acid-curing aminoplast resin with the aid of an acid type gelatin. By the term "acid-curing aminoplast resin" I mean the members of the class consisting of urea- and thiourea-formaldehyde condensation products and melamine-formaldehyde condensation products, all of which are light-colored thermosetting resins which are cured by heating at elevated temperatures in the presence of an acid. By the term "acid-type gelatin" I mean gelatin which exhibits an iso-electric point at a pH substantially higher than 4.7, which is the accepted pH value for the iso-electric point of ordinary glue. Acid-type gelatin is obtained from the same sources as ordinary gelatin and glue, but is a very pure form of gelatin prepared by a modified manufacturing process which results in a considerably lower degree of hydrolysis. A 1% solution of this gelatin has a pH of 3.98 and an iso-electric point at approximately pH=8.0.

The textile finishing emulsions of my invention can be prepared by vigorous agitation of the resinous ingredients, preferably in the form of a solution in an organic solvent, in an aqueous solution of the acid-type gelatin, with or without acidification by the addition of suitable quantities of an inorganic or organic acid. The resinous constituent may consist solely of an aminoplast resin such as a urea-formaldehyde or melamine-formaldehyde resin, but a resin of the alkyd type may be added to obtain a stiffer and livelier hand, increased resistance to abrasion, and increased retention upon laundering. By varying the alkyd resin used it is possible to obtain variations in the properties of the finished cloth. A preservative such as sodium penta-chlor phenate is also preferably used to prevent decomposition of the gelatin by the action of bacteria. The resin solution is preferably slowly added to the aqueous component containing the glue and preservative with vigorous agitation, such as is obtained by an agitator of the "Lightnin" type. After the resin is completely emulsified the composition may be thinned to the desired consistency by the addition of further amounts of water.

Emulsions prepared by the above method with the aid of acid-type gelatin have a greatly improved stability upon storage. Emulsions of this type have been stored at 120° F. and at 4° C., as well as at room temperatures, for several months without deteriorating. Other samples have been frozen at —80° C. and proved to be stable after thawing. The particle size of the emulsions ranges from 0.5 to 1.5 microns, the average being 1 micron, and they are therefore well suited for the impregnation and coating of the fibers of woven textile material without bridging over or other surface effects that are encountered with coarse emulsions of larger particle size.

Any of the methods now in use in textile finishing may be employed in applying my new emulsions to textile fabrics. The emulsion is preferably prepared and sold as a thick, milky white liquid having a solids content of 20-50% and a consistency similar to that of heavy cream. This emulsion may then be diluted in the textile mill simply by adding cold or warm water in the proper amounts, after which a cationic softener may be added if desired. No boiling is required as in the case of starch mixes and the cloth is preferably treated in the dry condition.

The cloth may be run through the liquor by the pad and batch method, or by the use of a pad box at the tenter, or by any other suitable mechanical method. The treated cloth is preferably dried at once, although it can be held wet and dried later if necessary. The drying can be done on cans, on frames or in drying boxes, and at the usual speeds and temperatures. Temperatures running from 240-320° F. at speeds of 60-90 yards per minute in a frame are preferable. After drying, the goods may be calendered and otherwise handled in the usual manner.

The invention will be described in greater detail by the following specific examples. It should be understood, however, that although these examples may illustrate in detail some of the more specific aspects of the invention they are given primarily for purposes of illustration and that the invention in its broader aspects is not limited thereto.

Example 1

A refluxed urea-formaldehyde resin having a urea-formaldehyde ratio of 1:2.2 was dissolved in a mixture of butanol and xylene to make a solution containing 50% resin, 30% butanol and 20% xylene.

54 parts by weight of acid-type gelatin were added to 347 parts of water containing 16 parts of a 1% aqueous solution of sodium penta-chlor phenate. The gelatin was soaked in the water overnight after which the mixture was heated to 160° F. to form a clear liquid, cooled at once to 85° F., and 15 parts by weight of glacial acetic acid were added.

The acidified gelatin solution was placed in a vessel equipped with efficient agitators, which were placed in operation. 648 parts by weight of the resin solution were then slowly added with vigorous agitation, whereupon a white emulsion of extremely fine particle size was formed. After all the resin had been added the emulsion was stirred for 5 minutes longer and thinned by adding 809 parts of water with continued stirring. Homogenization may be employed, but is not usually necessary when efficient stirring is used in making the emulsion.

Another emulsion was prepared using exactly the same quantities of ingredients and the same procedure, but substituting 648 parts of a 50% melamine-formaldehyde resin solution in butanol and xylene for the urea-formaldehyde resin solution.

Example 2

An oil-acid modified alkyd resin was prepared by heating together 18 parts by weight of phthalic anhydride, 10 parts of glycerol and 23.5 parts of castor oil fatty acids at 425° F. The heating was continued under reflux until a resin having an acid number of 6-8 was obtained. This resin was cut to 83% solids by the addition of butanol.

35 parts by weight of the 83% alkyd resin and 60 parts by weight of the urea-formaldehyde resin solution described in Example 1 were blended with the addition of 25 parts of a mixture of equal quantities of xylene and butanol. The resin blend was then slowly added to a solution of 10 parts by weight of acid-type gelatin which had been dissolved in 72 parts of water containing 2.25 parts of glacial acetic acid and 3 parts of a 1% aqueous solution of sodium penta-chlor phenate, using the procedure described in Example 1. Upon thinning the emulsion with 143 parts of water there was obtained a product that possessed excellent stability upon storage.

The three emulsions were applied to cotton cloth in a concentration such as to leave 12% of finish on the cloth. The emulsion containing the melamine-formaldehyde resin gave a stiff, full, lively hand to the cloth; the corresponding emulsion of Example 1 containing the urea-formaldehyde resin gave a slightly stiffer and fuller hand that was not quite as lively; the emulsion of Example 2 gave a stiffer, fuller and livelier hand than either of the two emulsions of Example 1, by reason of its alkyd resin content.

Samples of the impregnated cloth were given a total of ten successive launderings at two commercial laundries. The retention of the finishes on the cloth was very good, the finish of Example 2, however, being better than the finishes of Example 1 in this respect.

Example 3

Samples of cotton cloth were impregnated with 6% of each of the three finishes and after curing the cloth was soaped at 160° F. for 1 hour, using 0.3% soap and 0.2% soda ash solution. The retention after soaping was then determined quantitatively. 71.6% of the melamine resin and 81.8% of the urea-formaldehyde resin of Example 1 remained on the cloth, while 89.7% of the finish of Example 2 was retained.

Example 4

A melamine-formaldehyde resin emulsion containing a cationic softener was prepared by the following formulation, the parts being by weight:

| | Parts |
|---|---|
| Melamine-formaldehyde resin | 96 |
| Octadecylamine acetate | 3 |
| Acid-type gelatin | 4 |
| Glacial acetic acid | 1 |
| Water | 171 |
| Preservative as needed. | |

The "melamine-formaldehyde resin" was a 50% solution in a mixture of equal parts of butanol and xylene of a butylated pentamethylol melamine, obtained by condensing pentamethylol melamine with butanol in the presence of an acid condensing agent.

The gelatin was dissolved in about one-third of the water and the acetic acid was added in the usual manner. The octadecylamine acetate was dissolved in the melamine resin solution which was then slowly added to the aqueous gelatin solution, using the procedure described in Example 1. The resulting emulsion, upon dilution with the remainder of the water, was exceptionally stable upon storage and possessed excellent textile-finishing properties.

What I claim is:

1. A textile finishing composition comprising an emulsion of an acid-curing aminoplast resin in an acidified aqueous solution containing gelatin having an iso-electric point at approximately pH=8.0.

2. A textile finishing composition comprising an emulsion of a urea-formaldehyde resin in an acidified aqueous solution containing gelatin having an iso-electric point at approximately pH=8.0.

3. A textile finishing composition comprising an emulsion of an acid-curing aminoplast resin and an alkyd resin in an acidified aqueous solution containing gelatin having an iso-electric point at approximately pH=8.0.

4. A textile finishing composition comprising an emulsion of a urea-formaldehyde resin and an alkyd resin in an acidified aqueous solution containing gelatin having an iso-electric point at approximately pH=8.0.

JOHN M. HOOD.